United States Patent [19]

Yagita

[11] 4,050,054

[45] Sept. 20, 1977

[54] MULTI-CONTACT BRUSH TYPE FISH DETECTING SONAR

[75] Inventor: Yasunobu Yagita, Maisaka, Japan

[73] Assignee: Keisuke Honda, Japan

[21] Appl. No.: 583,552

[22] Filed: June 4, 1975

[30] Foreign Application Priority Data

| June 7, 1974 | Japan | 49-64807 |
| June 7, 1974 | Japan | 49-66116 |
| Dec. 2, 1974 | Japan | 49-139048 |
| Dec. 2, 1974 | Japan | 49-146518 |

[51] Int. Cl.$^2$ .......................... G01S 9/70; G01S 7/60
[52] U.S. Cl. ................................ 340/3 F; 346/33 EC
[58] Field of Search .................... 340/3 F; 346/33 EC

[56] References Cited

U.S. PATENT DOCUMENTS

| 2,641,457 | 6/1953 | Carleton | 346/7 |
| 3,363,226 | 1/1968 | Murphree | 340/3 F |
| 3,553,711 | 1/1971 | Kurimura et al. | 346/33 EC |
| 3,683,403 | 8/1972 | Okino | 346/33 EC |

Primary Examiner—Richard A. Farley
Attorney, Agent, or Firm—Burgess, Ryan and Wayne

[57] ABSTRACT

A scanning circuit consisting of a plurality of time delay circuits and a plurality of holding circuits at least equal in number to the delay circuits is provided for a fish detecting sonar. In response to the input pulse applied to the input terminal of the first stage delay circuit in synchronism with the sound pulse propagated, the delay circuits are triggered to reproduce the input pulses which are sequentially delayed by a time interval equal to the pulse width of the input pulse, and the output pulses from the delay circuits are held only by the holding circuits to which are applied the recording or echo signals. The output pulses held by the holding circuits are picked up by a brush, which slides over the contacts connected to the output terminals, respectively, of the holding circuits, and applied to a recording pen or stylus for recording. The above arrangement permits the recording or display even when the speed of the brush is relatively slow.

4 Claims, 5 Drawing Figures

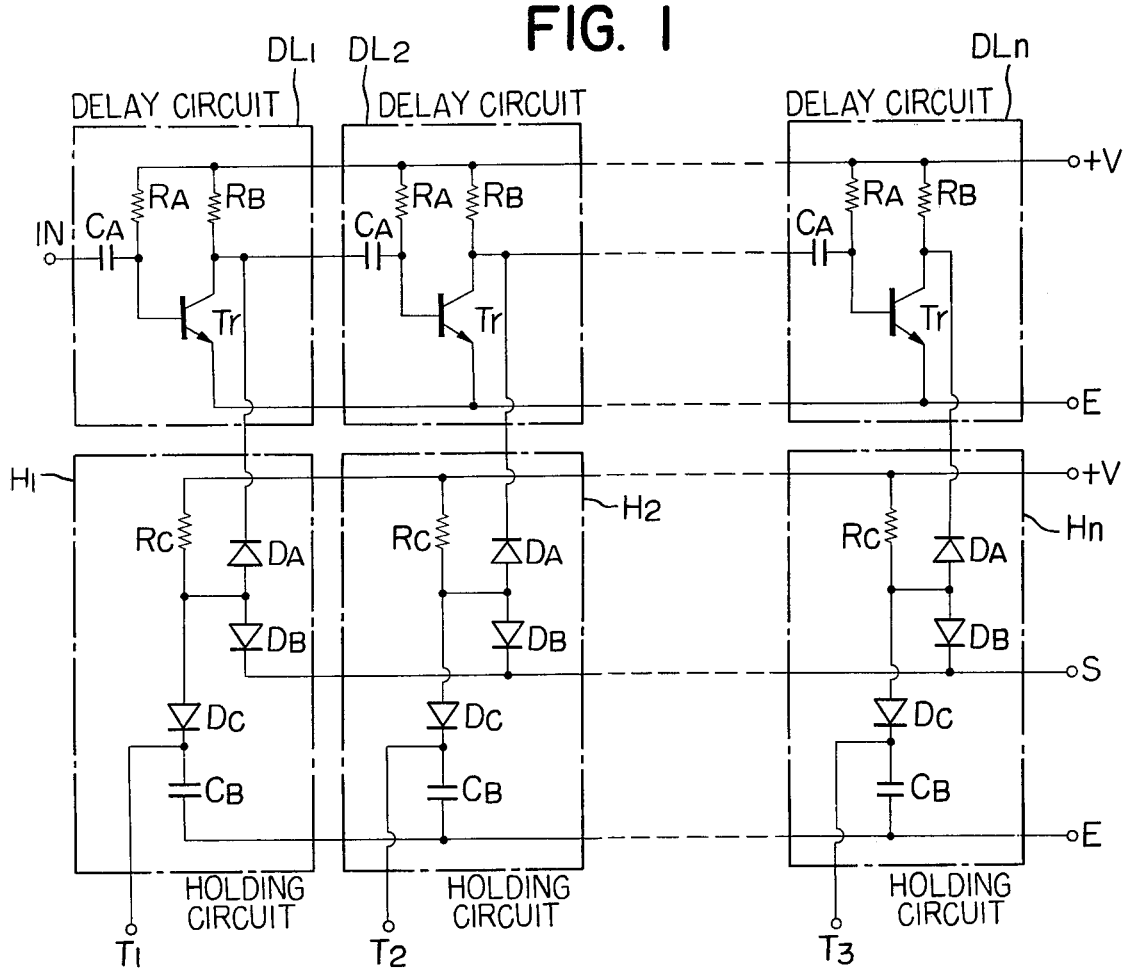
FIG. 1
FIG. 2
(a) INPUT PULSE TO DELAY CIRCUIT DL1 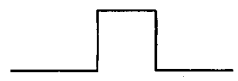
(b) TRIGGER SIGNALS APPLIED TO THE BASE OF THE TRANSISTOR Tr 
(c) COLLECTOR VOLTAGE OF THE TRANSISTOR Tr IN DL1 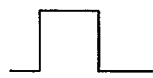
(d) TRIGGER SIGNALS APPLIED TO THE BASE OF THE TRANSISTOR Tr IN DL2 
(e) COLLECTOR VOLTAGE OF THE TRANSISTOR Tr IN DL2 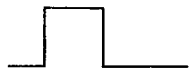

MULTI-CONTACT BRUSH TYPE FISH DETECTING SONAR

BACKGROUND OF THE INVENTION

The present invention relates to a multi-contact brush type fish detecting sonar of the type in which the input signals are applied to a recording pen or stylus through a brush which slides sequentially over a plurality of input contacts in a range recorder.

In the range recorder for the fish detecting sonar of the type described, the recording pen or stylus is so arranged as to move in unison with the brush, and in response to the pulse signal applied thereto in synchronism with the propagation of the sound pulse, the recording pen or stylus records on a recording sheet the time when the sound pulse is propagated, and also records the time when the echo signal is received. However, in general, the time taken for the sonar signal to travel to the target and back is very short so that unless the speed of the recording pen or stylus is very high, the display or recording of the surface and bottom is impossible. As a result, the wear of the brush which moves in unison with the recording pen or stylus is very rapid.

SUMMARY OF THE INVENTION

In view of the above, one of the objects of the present invention is to provide a multi-contact brush type fish detecting sonar characterized in that the moving speed of a recording pen or stylus and its brush is lowered in order to prevent the wear of the brush.

Another object of the present invention is to provide a multi-contact brush type fish detecting sonar in which the scanning signals are held in holding circuits in a scanning circuit so that the moving speed of the recording pen or stylus and brush may be sufficiently lowered to prevent the rapid wear of the brush.

To the above and other ends, briefly stated, the present invention provides an arrangement comprising a scanning circuit consisting of a plurality of time-delay circuits and a plurality of holding circuits at least equal in number to the delay circuits, the delay circuits being triggered by the input pulse applied to the input terminal of the first stage delay circuit in synchronism with the propagation of the sound pulse so as to reproduce the input pulses which are sequentially delayed by a time interval equal to the pulse width of the input pulse, the output pulses from the delay circuits being held only by the holding circuits to which are applied the recording or echo signals; a plurality of contacts connected to the output terminals of the holding circuits, respectively; a brush which slides over the contacts; and a recording pen or stylus which moves in unison with the brush. Therefore the moving speed of the recording pen or stylus and brush may be reduced sufficiently to prevent the wear of the brush.

BRIEF DESCRIPTION OF THE DRAWING

FIG. 1 is a diagram of a first embodiment of a scanning circuit in accordance with the present invention;

FIG. 2 shows waveforms at various points therein used for the explanation of the mode of operation thereof;

Same reference numerals are used to denote similar parts throughout the figures.

Figure 3:
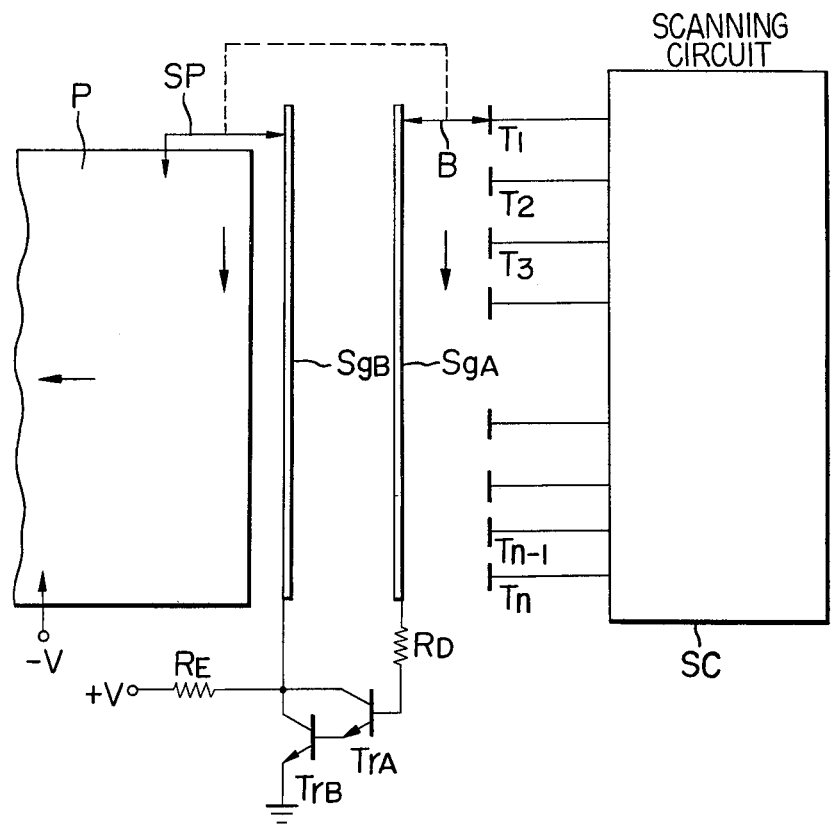
FIG. 3 is a diagram of a range recorder in accordance with the present invention.

DESCRIPTION OF THE PREFERRED EMBODIMENTS:

First Embodiment, FIGS. 1, 2 and 3

Scanning Circuit, FIGS. 1 and 2

In FIG. 1 there is shown the first embodiment of a scanning circuit in accordance with the present invention consisting of a plurality of delay circuits $DL_1$–$DL_n$ and a plurality of holding circuits $H_1$–$H_n$ equal in number to the delay circuits DL. Since the delay circuits $DL_1$–$DL_n$ are exactly similar in construction, it will suffice to describe only the first stage delay circuit $DL_1$. In the delay circuit $DL_1$, an input terminal IN is connected through a capacitor $C_A$ to the base of a transistor Tr and through a resistor $R_A$ to the positive terminal $+V$ of a dc Power source. The emitter of the transistor Tr is grounded while the collector is connected to the positive terminal $+V$ through a resistor $R_B$, to the base of a transistor Tr through a capacitor $C_A$ in the next stage and to the cathode of a diode $D_A$ of the corresponding holding circuit $H_1$. The holding circuits $H_1$–$H_n$ are also similar in construction so that the description of the first stage holding circuit $H_1$ will suffice. The diodes $D_A$ and $D_B$ are connected in the back-to-back relation, and the junction therebetween is connected through a resistor $R_C$ to the positive terminal $+V$ of the dc power supply and to the anode of a diode $D_C$. The cathode of the diode $D_B$ is connected to an input signal terminal S, and the cathode of the diode $D_C$ is connected through a capacitor $C_B$ to the grounding terminal E and to an output terminal $T_1$.

Next referring further to FIG. 2 illustrating the waveforms at various points of the delay circuits $DL_1$–$DL_n$ and holding circuits $H_1$–$H_n$, the transistor Tr in the delay circuit $DL_1$ normally remains turned on, and its collector potential is zero or ground potential. When the square input pulse as shown in FIG. 2(a) arrives at the input terminal IN, it is differentiated by the differentiating circuit consisting of the capacitor $C_A$ and the resistor $R_A$ into the trigger signal with the waveform with the positive and negative spikes or pips as shown in FIG. 2(B). The width of the trigger signal is dependent upon the $+V$ voltage and the values of the capacitor $C_A$ and resistor $R_A$. Thus the pulse width of the trigger signal of each delay circuit and the resultant scanning frequency of the group of delay circuits may be adjusted by varying the $+V$ voltage. Since the transistor Tr is normally on, the positive spike does not affect the condition of the transistor Tr, but the negative spike or trigger signal causes the transistor Tr to be turned off so that the square pulse substantially similar to that at the input terminal IN (see FIG. 2(a)) may be derived from the collector as shown in FIG. 2(c). It is seen that the leading edge of the square pulse derived from the collector coincides with the trailing edge of the input square pulse. The output square pulse from the first delay circuit $DL_1$ is applied to the next delay circuit $DL_2$ and to the diode $D_A$ of the first holding circuit $H_1$. Therefore, in like manner, the output square pulse is generated by the second delay circuit $DL_2$ and is applied to the next delay circuit $DL_3$ and to the anode $D_A$ of the second holding circuit $H_2$. Thus, it is seen that the output square pulse applied to one of the holding circuits H is delayed by a time equal to the pulse width from the square output pulse applied to the preceding holding circuit as shown in FIG. 2(d) which shows the base potential applied to the transistor Tr in the next delay circuit $DL_2$ and in FIG. 2(e) which shows the square output pulse therefrom.

Since the transistor Tr in the delay circuit DL is turned on, the current flows from the power source $+V$, to the resistor $R_C$ and the diode $D_A$. When the output pulse signal from the delay circuit DL appears and the signal arrives at the input signal terminal S, the current from the positive terminal $+V$ will not flow through the diodes $D_A$ and $D_B$, but it does flow through the diode $D_C$ so that the capacitor $C_B$ is charged to the potential at S. The voltage across the capacitor $C_B$ is the output voltage from the holding circuit H which appears at the output terminal T.

Next referring to FIG. 3, a range recorder of the present invention will be described. One end of a brush B is made into intermittent contact with the output terminals $T_1-T_n$ of the holding circuits $H_1-H_n$ while the other end is made into continuous sliding contact with a first conductor member $Sg_A$. A recording pen or stylus SP is so arranged as to move in unison with the brush B with one end of the recording pin SP in contact with a second conductor member $Sg_B$ and the other end in contact with a recording sheet P. The first conductor member $Sg_A$ is electrically connected through a resistor $R_D$ to the base of a transistor $Tr_A$ of a Darlington circuit, the collector of which is connected to the second conductor member $Sg_B$ and to the collector of a transistor $Tr_B$ and to the positive terminal $+B$ of the dc power source. The emitter of the transistor $Tr_A$ is connected to the base of the transistor $Tr_B$, the emitter of which is grounded. The recording sheet P is of the discharge recording type and is electrically connected to the negative terminal $-V$ of the dc power source.

Next the mode of operation of the range recorder with the above construction will be described. The pulse output signal from one of the output terminals $T_1-T_n$ of the holding circuits $H_1-H_n$ is amplified by the Darlington circuit consisting of the transistors $Tr_A$ and $Tr_B$, and the output signal from the Darlington circuit is applied through the second conductor member $Sg_B$ to the recording pen SP so that the recording may be made on the recording sheet P by the discharge between the recording pen SP and the recording sheet P in a manner well known in the art.

As described above, the energy stored on the capacitor $C_B$ in the holding circuit H is discharged only when the brush B is made into contact with the output terminal connected to the capacitor $C_B$. This means that in the fish detecting sonar even when the time interval between the time when the sound pulses transmitted from the transducer and the time when the echo is received by the transducer is short, the echo signal may be held by the holding circuits H so that the surface and underwater conditions may be recorded in a reliable manner even when the speed of the brush B and the recording pen SP is slow.

Figure 5:
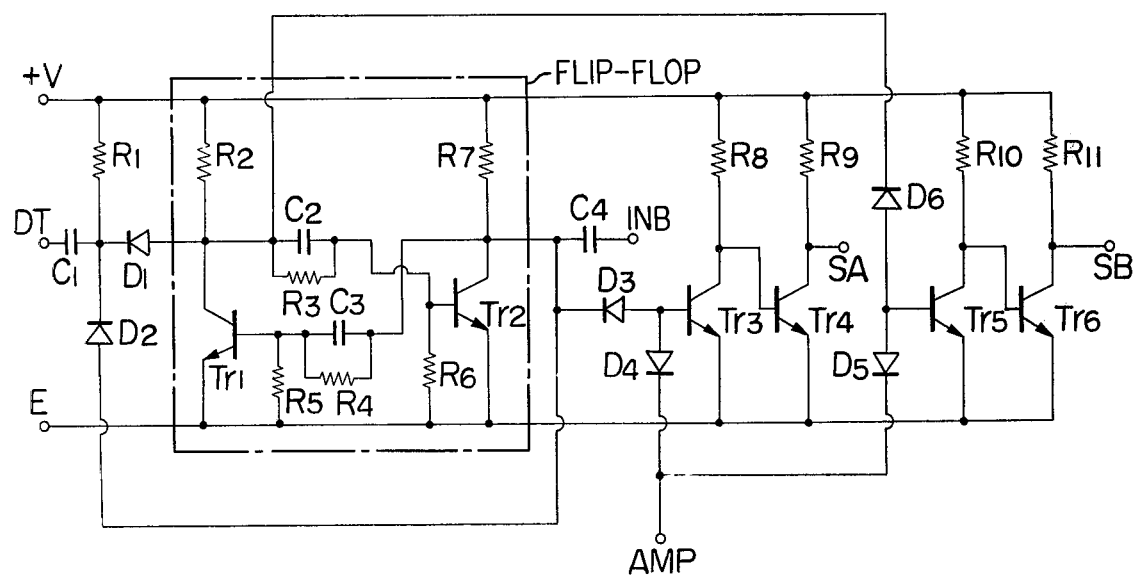
FIGS. 4 and 5 are diagrams of a second embodiment of a scanning circuit in accordance with the present invention.
Figure 4:
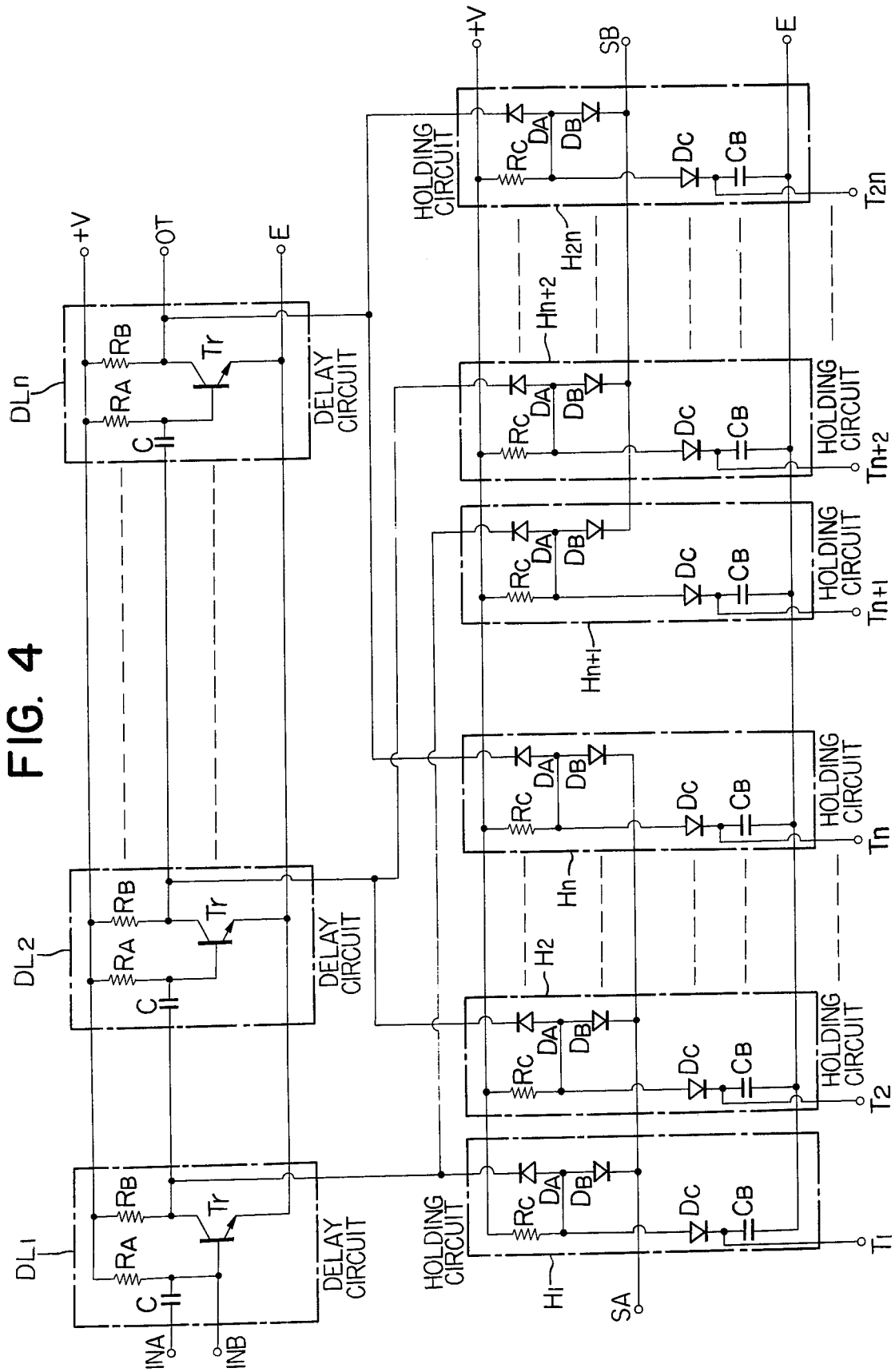

Second Embodiment, FIGS. 4 and 5

FIGS. 4 and 5 show the second embodiment of the scanning circuit in accordance with the present invention comprising a plurality of delay circuits $DL_1-DL_n$, a plurality of holding circuits $H_1-H_n$ and $H_{n+1}-H_{2n}$ equal in number to twice the number of delay circuits DL, and a switching circuit shown in FIG. 5. The input signal terminal $S_A$ of the holding circuits $H_1-H_n$ is electrically connected to the terminal $S_A$ of the switching circuit while the input signal terminal $S_B$, to the output terminal $S_B$.

Referring to FIG. 5, the construction of the switching circuit will be described. The output terminal OT of the delay circuit $DL_n$ is connected to the terminal OT of the switching circuit which in turn is connected through a capacitor $C_1$ and a diode $D_1$ to a flip-flop FF and to the positive terminal $+V$ of the dc power source through a resistor $R_1$. The flip-flop FF, which comprises transistors $Tr_1$ and $Tr_2$, resistors $R_2$ through $R_7$ and capacitors $C_2$ and $C_3$, has the output terminal connected through a capacitor $C_4$ to the input terminal INB of the delay circuit $DL_1$ and to the base of a transistor $Tr_3$ through a diode $D_3$. The base of the transistor $Tr_3$ is connected through a diode $D_4$ to the output terminal AMP of a receiver (not shown) of a fish detecting sonar, and the collector is connected through a resistor $R_8$ to the positive terminal $+V$ and to the base of a transistor $Tr_4$. The collector of the transistor $Tr_4$ is connected through a resistor $R_9$ to the positive terminal $+V$ and to the input signal terminal $S_A$ of the holding circuits $H_1-H_n$. The output terminal AMP is connected through a diode $D_5$ to the base of a transistor $Tr_5$ and through a diode $D_6$ to the base of transistor $Tr_1$ of the flip-flop FF. The collector of the transistor $Tr_5$ is connected through a resistor $R_{10}$ to the positive terminal $+V$ and to the base of a transistor $Tr_6$. The collector of the transistor $Tr_6$ is connected through a resistor $R_{11}$ to the positive terminal $+V$ and to the input signal terminal $S_B$ of the holding circuits $H_{n+1}-H_{2n}$.

Next the mode of operation of the second embodiment with the above construction will be described as being applied to a fish detecting sonar. Simultaneously when the sound pulse is propagated, the pulse signal arrives at the input terminal INA of the first delay circuit $DL_1$ so that the pulse signals which are sequentially delayed by a time interval equal to the pulse width of the input pulse signal are applied to the holding circuits $H_1-H_n$ in a manner substantially similar to that of the first embodiment. When the transistor $Tr_1$ of the flip-flop FF in the switching circuit shown in FIG. 5 is turned on, the base potential of the transistor $Tr_5$ is equal to zero or ground potential regardless of the output from the receiver. As a result, the transistor $Tr_5$ is turned off while the transistor $Tr_6$ is turned on so that the potential at the input signal terminal $S_B$ of the holding circuits $H_{n+1}-H_{2n}$ is equal to zero or ground potential. Therefore no output signal is derived from the output terminals $T_{n+1}-T_{2n}$. Since the transistor $Tr_2$ of the flip-flop FF is turned off, when the output from the receiver appears at the terminal AMP in response to the reception of the echo signal, the transistor $Tr_3$ is turned on while the transistor $Tr_4$ is turned off. Therefore, the output pulses from the delay circuits $DL_1-DL_n$ are stored and held by the capacitors $C_B$ and are derived from the output terminals $T_1-T_n$ of the holding circuits $H_1-H_n$ in a manner substantially similar to that of the first embodiment. However, when there is no output signal at the terminal AMP, the transistor $Tr_3$ is turned off while the transistor $Tr_4$ is turned on so that no output signal is derived from the holding circuits $H_1-H_n$.

When the output pulse is transmitted from the output terminal OT of the last delay circuit $DL_n$ through the capacitor $C_1$ and the diode $D_1$ to the input terminal of the flip-flop FF, the transistor $Tr_1$ is turned off while the transistor $Tr_2$ is turned on so that the negative trigger signal is derived from the terminal INB. In response to this negative trigger pulse, the delay circuits $DL_1-DL_n$ are triggered to generate the delayed pulse signals in the manner described above. Since the transistor $Tr_2$ in the flip-flop FF is turned on, the transistor $Tr_3$ is turned off while the transistor $Tr_4$ is turned on so that the potential at the terminal $S_A$ becomes equal to the ground potential or zero. As a result, no output signal is derived from the output terminals $T_1-T_n$ of the holding circuits $H_1-H_n$. In response to the output signal which appears at the output terminal AMP, the transistor $Tr_5$ is turned on while the transistor $Tr_6$ is turned off so that the delayed output pulses from the delay circuits $DL_1-DL_n$ are held by the holding circuits $H_{n+1}-H_{2n}$ in a manner substantially similar to that described hereinbefore. When the output pulse appears at the output terminal OT of the last delay circuit $DL_n$, the state of the flip-flop FF is reversed. That is, the transistor $Tr_1$ is turned on while the transistor $Tr_2$ is turned off so that the positive trigger pulse appears at the terminal INB. As described with reference to the first embodiment, the delay circuits $DL_1-DL_n$ are not triggered by the positive trigger signal so that they remain de-energized until the next input pulse appears at the input terminal INA.

In the second embodiment, the transistor $Tr_1$ of the flip-flop FF has been described as being initially turned on with the transistor $Tr_2$ being turned off, but it is to be understood that the transistor $Tr_1$ may be initially turned off while the transistor $Tr_2$ may be initially turned on because after the second input pulse has been applied to the delay circuit $DL_1$, the transistor $Tr_1$ is turned on while the transistor $Tr_2$ is turned off. Furthermore, the second embodiment has been described as comprising a number of $n$ delay circuits DL and a number of $2n$ holding circuits, but it is to be understood that a number of $an$ ($a \geq 2$) holding circuits may be connected to the delay circuits. In this case, more than two flip-flops and a circuit for discriminating the outputs from the flip-flops may be required.

The scanning circuit of the second embodiment may be used in conjunction with the recorder shown in FIG. 3 in a manner substantially similar to that of the first embodiment.

What is claimed is:
1. A multi-contact brush type fish detecting sonar, comprising
   a. a plurality of cascaded delay circuits each having an input terminal, a transistor, a differentiating circuit connecting said input terminal to a base of said transistor, and an output terminal connected to a collector of the transistor the output terminal of each delay circuit being connected to the input terminal of the next succeeding delay circuit;
   b. a plurality of holding circuits each having two diodes, a signal input terminal of each holding circuit connected to one of said two diodes, means connecting the other of said two diodes to the corresponding output terminal of one of said delay circuits, a holding signal output terminal, a capacitor means for coupling a terminal of said capacitor to the anodes of said two diodes for holding a sonar return signal to be recorded when a delay output pulse from said corresponding delay circuit and the reflected sonar signal applied to said signal input terminal are concurrently applied to said two diodes; and
   c. recorder means with a plurality of contacts connected to the output terminals of said holding circuits, respectively, a slidable brush, and a recording pen slidable over a recording sheet in unison with said brush which slides over said contacts.

2. A multi-contact brush type fish detecting sonar as set forth in claim 1 wherein said recording means includes
   amplifier means for amplifying the output signals from said holding circuits picked up by said brush, the amplified output signals being applied to said recording pen; and
   said recording sheet is of the discharge destruction type.

3. A multi-contact brush type fish detecting sonar as set forth in claim 1 wherein said holding circuits are equal in number to an integral multiple of said delay circuits; and
   a switching circuit is provided for electrically connecting a group of holding circuits selected out of said holding circuits and equal in number to said delay circuits, respectively.

4. A multi-contact brush type fish detecting sonar as set forth in claim 3 wherein said switching circuit includes a flip-flop circuit which, in response to the output pulse from the delay circuit in the last stage, generates the trigger signal which is applied to the input terminal of the delay circuit in the first stage, whereby said delay circuits are triggered again sequentially.

* * * * *